(12) United States Patent
Zheng

(10) Patent No.: US 11,451,628 B2
(45) Date of Patent: Sep. 20, 2022

(54) FILE RESOURCE PROCESSING METHOD AND APPARATUS, DEVICE AND MEDIUM

(71) Applicant: Beijing Baidu Netcom Science And Technology Co Ltd, Beijing (CN)

(72) Inventor: Pengfei Zheng, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 0 days.

(21) Appl. No.: 17/209,289

(22) Filed: Mar. 23, 2021

(65) Prior Publication Data
US 2021/0211498 A1    Jul. 8, 2021

(30) Foreign Application Priority Data
May 29, 2020 (CN) .......................... 202010482135.1

(51) Int. Cl.
*H04L 67/1097* (2022.01)
*G06F 11/07* (2006.01)
(Continued)

(52) U.S. Cl.
CPC ...... *H04L 67/1097* (2013.01); *G06F 11/0772* (2013.01); *G06F 11/3034* (2013.01); *H04L 47/783* (2013.01); *H04L 67/1078* (2013.01)

(58) Field of Classification Search
CPC ............. H04L 67/1097; H04L 67/1078; H04L 47/783; G06F 11/0772; G06F 11/3034
See application file for complete search history.

(56) References Cited

U.S. PATENT DOCUMENTS 7,356,531 B1 * 4/2008 Popelka ................. G06F 16/10
709/225
9,304,861 B2   4/2016 Russell et al.
(Continued)

FOREIGN PATENT DOCUMENTS

CN        103516766 A      1/2014
CN        105740061 A      7/2016
(Continued)

OTHER PUBLICATIONS

Extended European Search Report issued in connection with corresponding European Patent Application No. 21164286.3, dated Sep. 23, 2021.
(Continued)

*Primary Examiner* — Shean Tokuta
(74) *Attorney, Agent, or Firm* — Akerman LLP

(57) ABSTRACT

The embodiment of the present application discloses a file resource processing method and apparatus, a device and a medium, relates to a file system processing technology and the field of cloud computing. Herein, the file resource processing method includes the following steps of: receiving a file resource access request of a terminal, and determining a target file resource requested to be accessed by the terminal according to the file resource access request; marking the target file resource as a state of entering a grace period, in response to determining that the file resource access request belongs to a reestablishing resource state request; and executing an access operation corresponding to the file resource access request based on the target file resource, in response to determining that the file resource access request does not belong to the reestablishing resource state request.

18 Claims, 4 Drawing Sheets

(51) Int. Cl.
  *G06F 11/30* (2006.01)
  *H04L 47/783* (2022.01)
  *H04L 67/1074* (2022.01)

(56) References Cited

U.S. PATENT DOCUMENTS

| | | | | |
|---|---|---|---|---|
| 2006/0212453 | A1* | 9/2006 | Eshel | G06F 11/2046 |
| 2007/0168398 | A1 | 7/2007 | Miroshnichenko et al. | |
| 2012/0259819 | A1* | 10/2012 | Patwardhan | G06F 16/119 707/674 |
| 2012/0259820 | A1* | 10/2012 | Patwardhan | G06F 16/183 707/674 |
| 2013/0066949 | A1* | 3/2013 | Colrain | G06F 9/466 709/203 |
| 2013/0191434 | A1* | 7/2013 | Smith | H04L 69/326 709/201 |
| 2014/0280398 | A1* | 9/2014 | Smith | H04L 69/326 707/825 |
| 2015/0006955 | A1* | 1/2015 | Russell | G06F 11/0709 714/15 |
| 2017/0142117 | A1* | 5/2017 | Wong | H04L 67/32 |
| 2020/0026606 | A1* | 1/2020 | Farnum | G06F 11/07 |
| 2020/0034450 | A1* | 1/2020 | Layton | G06F 16/1727 |
| 2021/0211498 | A1* | 7/2021 | Zheng | G06F 16/183 |

FOREIGN PATENT DOCUMENTS

| | | | | |
|---|---|---|---|---|
| CN | 107301018 | A * | 10/2017 | G06F 3/0604 |
| CN | 108076155 | A | 5/2018 | |
| CN | 110990190 | A | 4/2020 | |
| CN | 111125048 | A * | 5/2020 | |
| CN | 111125048 | A | 5/2020 | |
| CN | 111680015 | A * | 9/2020 | G06F 11/0772 |
| EP | 3232609 | B1 * | 9/2019 | G06F 11/16 |
| JP | 2007241808 | A | 9/2007 | |
| WO | WO-2014205559 | A1 * | 12/2014 | G06F 11/0709 |

OTHER PUBLICATIONS

Shepler et al., "Network File System (NFS) Version 4 Protocol," Internet Engineering Task Force, Standard, Internet Society 4, Apr. 1, 2003, Section 8.6.2, pp. 79-81.
Notice of Reasons for Refusal issued Jul. 21, 2022 in connection with corresponding Japanese Patent Application No. 2021-086793.

* cited by examiner

FILE RESOURCE PROCESSING METHOD AND APPARATUS, DEVICE AND MEDIUM

CROSS-REFERENCE TO RELATED APPLICATION

This application claims priority to Chinese patent application No. 202010482135.1, filed on May 29, 2020, which is hereby incorporated by reference in its entirety.

TECHNICAL FIELD

The embodiment of the present application relates to a computer technology, specifically to a file system processing technology and the field of cloud computing, and particularly to a file resource processing method and apparatus, a device and a medium.

BACKGROUND

A Network File System (NFS) is a widely used network file system protocol that can be used to share file data between different devices.

During the use of NFS protocol by a device, the device may hold some exclusive or shared resources. In order to ensure the continuity and security of file service, the NFS protocol stipulates that in a case where a server is in the process of failure recovery, it needs to enter a grace period first, during which a client and the server reestablish an NFS protocol session, and the client anew requests the server for the resources held before a failure occurs to the server.

SUMMARY

Embodiments of the present application provides a file resource processing method and apparatus, a device and a medium, so as to realize to provide a brand-new failure recovery mechanism of a network file system, reduce the range of limited services within a failure recovery grace period from a system level (or a terminal level) to a resource level, and improve the usability of the file system.

According to an aspect of the embodiments of the present application, a file resource processing method is provided, including:

receiving a file resource access request of a terminal, and determining a target file resource requested to be accessed by the terminal according to the file resource access request;

marking the target file resource as a state of entering a grace period, in response to determining that the file resource access request belongs to a reestablishing resource state request; and executing an access operation corresponding to the file resource access request based on the target file resource, in response to determining that the file resource access request does not belong to the reestablishing resource state request.

According to another aspect of the embodiments of the present application, a file resource processing apparatus is provided, including:

a resource determining module configured for receiving a file resource access request of a terminal, and determining a target file resource requested to be accessed by the terminal according to the file resource access request;

a state marking module configured for marking the target file resource as a state of entering a grace period, in response to determining that the file resource access request belongs to a reestablishing resource state request; and an operation executing module configured for executing an access operation corresponding to the file resource access request based on the target file resource, in response to determining that the file resource access request does not belong to the reestablishing resource state request.

According to another aspect of the embodiments of the present application, an electronic device is provided, including:

at least one processor; and a memory communicatively connected to the at least one processor; wherein, the memory stores instructions executable by the at least one processor, the instructions being executed by the at least one processor to enable the at least one processor to execute the file resource processing method as described in any one of the embodiments of the present application.

According to another aspect of the embodiments of the present application, a non-transitory computer readable storage medium storing computer instructions is provided, wherein the computer instructions cause a computer to execute the file resource processing method as described in any one of the embodiments of the present application.

It should be understood that the content described in this section is intended neither to identify the key or important features of the embodiments of the present application, nor to limit the scope of the present application. Other features of the present application will be easily understood from the following description.

BRIEF DESCRIPTION OF THE DRAWINGS

The drawings are provided for better understanding of the present application, rather than limiting the present application. In which.

DETAILED DESCRIPTION

Exemplary embodiments of the present application are described below in combination with the accompanying drawings, including various details of the embodiments of the present application to facilitate the understanding, and they should be considered as merely exemplary. Thus, it should be realized by those of ordinary skill in the art that various changes and modifications can be made to the embodiments described here without departing from the scope and spirit of the present application. Also, for the sake of clarity and conciseness, the contents of well-known functions and structures are omitted in the following description.

During the use of NFS protocol by a device, the device may hold some exclusive or shared resources. In order to ensure the continuity and security of file service, the NFS protocol stipulates that in a case where a server is in the process of failure recovery, it needs to enter a grace period first, during which a client and the server reestablish an NFS protocol session, and the client anew requests the server for the resources held before a failure occurs to the server. Currently, within the grace period, except that an operation of reestablishing the resource state is supported by the server, the server is prohibited from other operations, which makes the file system unavailable for a long time.

Figure 1:
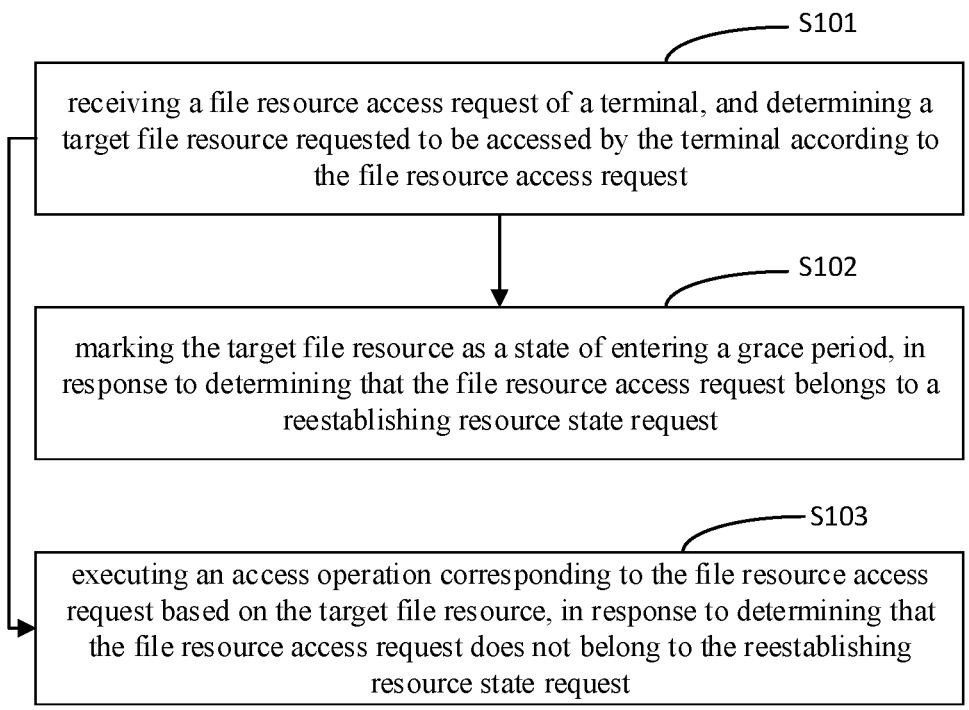
FIG. 1 is a flowchart of a file resource processing method disclosed according to an embodiment of the present application.

FIG. 1 is a flowchart of a file resource processing method disclosed according to an embodiment of the present application. The embodiment of the present application can be applied to the case of how to process a file resource in a server within a grace period of failure recovery after a failure occurs to a terminal or the server. The method disclosed by the embodiment of the present application can be executed by a file resource processing apparatus. The file resource processing apparatus may be implemented by software and/or hardware, and may be integrated on any electronic device with computing capabilities, such as a server supporting a network file system and the like, which may be referred to as a resource server or an NFS server for short. The following uses a resource server as an example to illustrate the embodiments of the present application.

As shown in FIG. 1, the file resource processing method disclosed by the embodiment of the present application may include:

S101, receiving a file resource access request of a terminal, and determining a target file resource requested to be accessed by the terminal according to the file resource access request.

Specifically, a resource server may establish a communication connection with a plurality of terminals, and realize to provide file resource for a terminal, in responding to a file resource access request of the terminal. The terminal is deployed with a client corresponding to the network file system, and may specifically be a device such as a user mobile terminal, a tablet computer and the like. The user may trigger a file resource access request in the terminal according to the requirement for file data in the service processing process, and then send the file resource access request to the resource server. After receiving the file resource access request sent by the terminal, the resource server determines the target file resource requested to be accessed by the terminal, according to the information carried in this request. Herein, the information carried in the file resource access request may include, but be not limited to, a terminal identification, a file name or a file identification requested to be accessed, and the like.

In the embodiment of the present application, in the process of establishing a communication connection between a resource server and a terminal and performing data transmission, the process of recovery after the failure of the resource server or the process of recovery after the failure of the terminal may be collectively referred to as a grace period for file system failure recovery, and the failure recovery process of the resource server may be preferably used as the grace period. The resource server executes different response operations for a file resource access request received within the grace period, according to the type of the request, which may include a reestablishing resource state request and a non-reestablishing resource state request. The occurrence of a failure of either party may cause the communication transmission between the resource server and the terminal to be interrupted, and the type of the failure is not limited in the embodiments of the present application and may include any existing device failure type.

S102, marking the target file resource as a state of entering a grace period, in response to determining that the file resource access request belongs to a reestablishing resource state request.

Herein, a reestablishing resource state request, or referred to as a file resource recovery request, refers to a terminal re-requesting, from a resource server, a file resource that has been requested or held before a failure occurs. After a failure occurs to the terminal or the resource server, the resource server reserves a preset time for the terminal for the file resource requested by the terminal before the failure, in a case where the terminal does not re-request the file resource beyond the preset time, the resource server may release the file resource, and the time length of the preset time may be flexibly set. Therefore, in response to determining that the file resource access request currently sent by the terminal belongs to a reestablishing resource state request, the resource server marks the target file resource as a state of entering a grace period, i.e., the target file resource is shared by the current terminal, and the current terminal is allowed to re-request to recover the access state to the file resource.

In addition, after the resource server is restarted, due to, such as failure or system upgrade, communication interruption may occur to the file resource requested by the terminal, at the moment, the resource server may actively mark the file resource having been requested by the terminal as the state of entering the grace period, without waiting for the terminal to send a reestablishing resource state request for the file resource before performing the state marking; or after the resource server monitors that the terminal fails, the file resource having been requested by the failed terminal can be actively marked as the state of entering the grace period, without waiting for the terminal to send a reestablishing resource state request, which can reduce the delay of the grace period duration due to communication interaction and optimize the release time of the file resource.

S103, executing an access operation corresponding to the file resource access request based on the target file resource, in response to determining that the file resource access request does not belong to the reestablishing resource state request.

In responding to determining that the file resource access request does not belong to a reestablishing resource state request, the resource server can still use the target file resource as a resource object for normally providing the file service, and execute an access operation corresponding to the file resource access request, such as a file opening operation, a file closing operation, a file reading operation, a file rewriting operation for the target file resource, so as to meet the access requirement of the terminal on the file resource, and it will not make other requests other than the reestablishing resource state request fail to be responded by the resource server due to the fact that the resource server is currently in the grace period of failure recovery.

Regarding how the resource server determines whether the file resource access request belongs to the realization of the reestablishing resource state request, it can be realized by confirming whether the target file resource belongs to the file resource having been requested by the terminal before a failure occurs, for example, the resource server respectively records the file resource requested by the terminal, and matches the target file resource requested by the terminal within the grace period in the file resource record information, and if so, it can be determined that the current file resource access request belongs to a reestablishing resource state request, otherwise not; or the resource server may identify whether the current file resource access request carries a preset identification, which is used for distinguishing the reestablishing resource state request from the non-reestablishing resource state request. Of course, on the basis of ensuring that the resource server can realize to distinguish whether the current file resource access request belongs to the reestablishing resource state request, the embodiment of the present application does not limit the specific implementation process thereof, and the specific implementation method is not limited to the foregoing example.

According to the technical solution of the embodiment of the present application, the target file resource corresponding to the reestablishing resource state request sent by the terminal is marked as the state of entering the grace period within the failure recovery grace period, and target file resources corresponding to other requests not belonging to the reestablishing resource state request sent by the terminal are still used as resource objects for normally providing the file service, so as to realize to provide a brand-new failure recovery mechanism of a network file system, reduce the range of limited services within a failure recovery grace period from a system level (or a terminal level) to a resource level, and improve the usability of the file system.

According to the technical solution of the embodiment of the present application, the target file resource corresponding to the reestablishing resource state request sent by the terminal is marked as the state of entering the grace period within a grace period of server failure recovery or terminal failure recovery, and target file resources corresponding to other requests not belonging to the reestablishing resource state request sent by the terminal are still used as resource objects for normally providing the file service, so as to realize to provide a brand-new failure recovery mechanism of a network file system, reduce the range of limited services within a failure recovery grace period from a system level (or a terminal level) to a resource level, i.e., limiting the specific file resource that the server can provide to the terminal within the failure recovery grace period, rather than leaving the server as a whole in a state where it cannot provide services other than resource recovery to the terminal or leaving the terminal in a state where it cannot request services other than resource recovery, thereby solving the problem that the server is in an unavailable state for a long time due to that the server only executes the operation related to reestablishment resource state within the failure recovery grace period in the existing solution, improving the usability of the file system, and shortening the range of services that the resource server cannot provide.

On the basis of the above-mentioned technical solution, optionally, the determining that the file resource access request belongs to the reestablishing resource state request may include: determining that the file resource access request belongs to the reestablishing resource state request, in a case where the target file resource is inquired from file resource allocation information recorded before a failure occurs to the server or the terminal; wherein, the file resource allocation information may include terminal information and file resource information requested by the terminal. For example, in the data transmission process of the resource server and the terminal, the resource server can respectively record file resources requested by each terminal according to the corresponding relationship between the terminal identification (terminal ID) and the file resource identification (resource ID), so that the query effect of the file resource information is realized, and a data foundation is laid for confirming whether the file resource access request sent by the terminal in the grace period belongs to a reestablishing resource state request.

Further, in a process of marking the target file resource as the state of entering the grace period, the method may further include: recording a resource protection range and a protection type of the target file resource within the grace period, i.e., the embodiment of the present application can realize fine management of the file resource state information. Herein, the protection type refers to an operation type about a target file resource, which the resource server allows a terminal to request recovery within a grace period. Specifically, the protection type may at least include a file lock type, which includes a shared lock and a mutex lock, and the protection type may also include operations of opening, closing, reading, rewriting and the like of the file. The resource protection range refers to a file range in which a resource server allows a terminal to request recovery within a grace period, for example, the resource protection range may be the whole target file resource, or a part of the target file resource.

The specific determination of the resource protection range and protection type relates to the information about the file resource requested by the terminal, recorded by the resource server before a failure occurs to the server or a failure occurs to the terminal. For example, before a failure occurs to the resource server, the resource server records that a shared lock or a mutex lock is added to a file resource requested by a terminal, and then within a grace period, the resource server simultaneously records that the protection type of the file resource includes the shared lock or the mutex lock. For a shared lock, a file resource marked as a state of entering a grace period can be simultaneously recovered and held by a plurality of terminals or a plurality of threads; and for a mutex lock, a file resource marked as a state of entering a grace period can only be recovered and held by one terminal or one thread.

Figure 2:
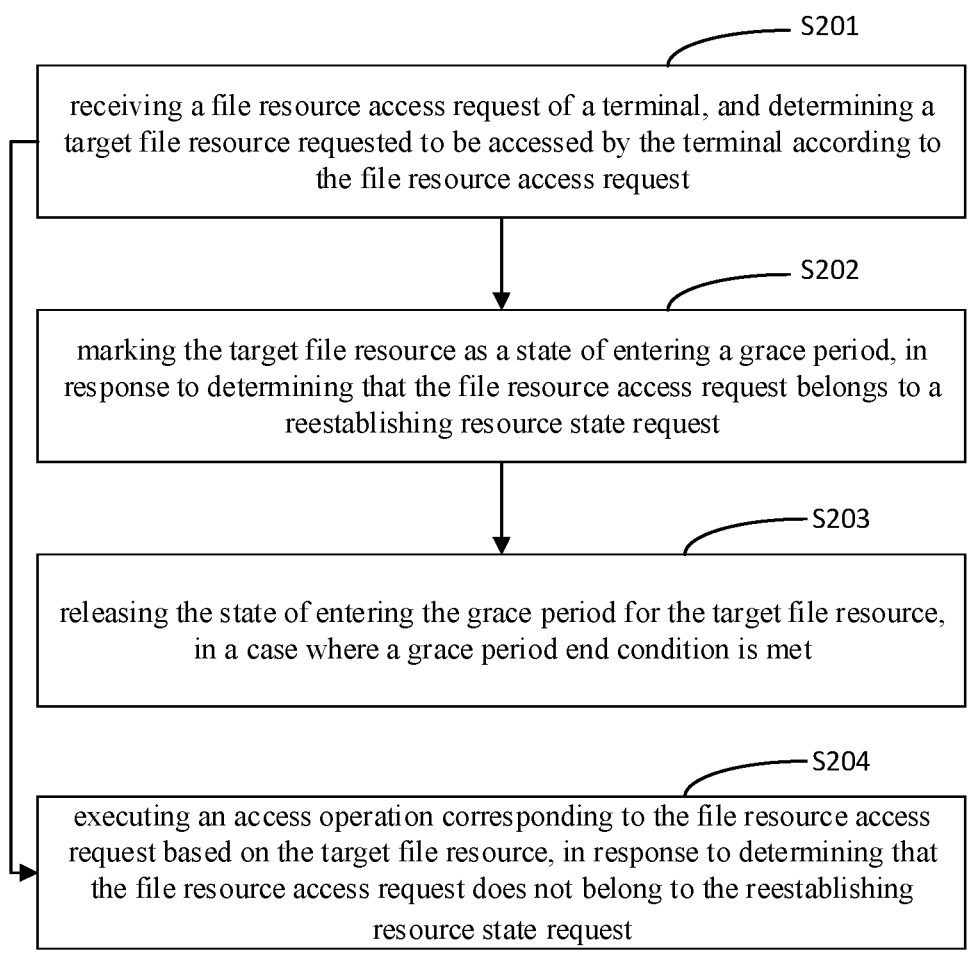
FIG. 2 is a flowchart of another file resource processing method disclosed according to an embodiment of the present application.

FIG. 2 is a flowchart of another file resource processing method disclosed according to an embodiment of the present application, which is further optimized and extended based on the above-mentioned technical solution, and may be combined with various optional implementations described above. As shown in FIG. 2, the method may include:

S201, receiving a file resource access request of a terminal, and determining a target file resource requested to be accessed by the terminal according to the file resource access request;

S202, marking the target file resource as a state of entering a grace period, in response to determining that the file resource access request belongs to a reestablishing resource state request;

S203, releasing the state of entering the grace period for the target file resource, in a case where a grace period end condition is met; and S204, executing an access operation corresponding to the file resource access request based on the target file resource, in response to determining that the file resource access request does not belong to the reestablishing resource state request.

Herein, the grace period end condition refers to a condition that the state of entering the grace period for the file resource can be released or eliminated, and may be set according to an actual situation. After the grace period end condition is met, the resource server will not reserve the target file resource for the current terminal and timely release the service limit of the target file resource, so that other terminals can normally request this target file resource according to requirements, and the availability of the file resource is improved.

According to the technical solution of the embodiment of the present application, the target file resource corresponding to the reestablishing resource state request sent by the terminal is marked as the state of entering the grace period within the failure recovery grace period, and target file resources corresponding to other requests not belonging to the reestablishing resource state request sent by the terminal are still used as resource objects for normally providing the file service, so as to realize to provide a brand-new failure recovery mechanism of a network file system, reduce the range of limited services within a failure recovery grace period from a system level (or a terminal level) to a resource level, thereby solving the problem that the server is in an unavailable state for a long time due to that the server only executes the operation related to reestablishment resource state within the failure recovery grace period in the existing solution, and improving the usability of the file system. Moreover, in a case where the grace period end condition is met, the state of entering the grace period for the target file resource is timely released, and the service limit of the target file resource is timely released, thereby improving the availability of the file resource.

On the basis of the above-mentioned technical solution, optionally, the grace period end condition may include, but be not limited to: a preset grace period time reaches a set time threshold value or an execution of an access recovery operation for the target file resource ends. Herein, the set time threshold value may be determined according to requirements, and the value thereof is not limited by the embodiments of the present application, and is usually measured in seconds.

Illustratively, a resource server may start the grace period timing in the process of receiving a file resource access request of a terminal and determining that the file resource access request belongs to a reestablishing resource state request, and automatically release the state of entering the grace period for the target file resource after the counted preset grace period time reaches a set time threshold value; or, the resource server may automatically release the state of entering the grace period for the target file resource after detecting the end of the execution of the access recovery operation for the target file resource (or so-called the completion of resource reestablishment). By reasonably setting the grace period end condition and timely releasing the service limit of the target file resource, the availability of the file resource is improved, and the time that the resource server cannot provide the file resource service is shortened.

Figure 3:
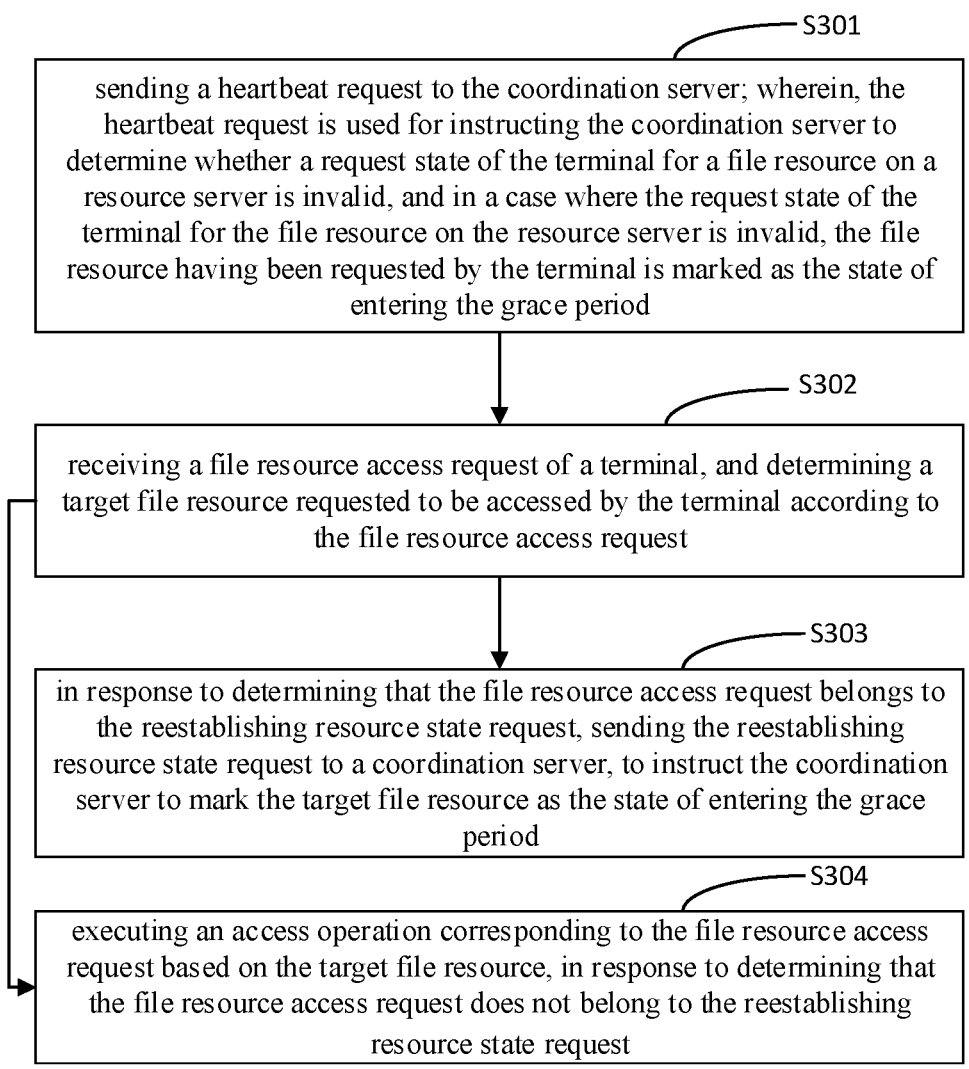
FIG. 3 is a flowchart of another file resource processing method disclosed according to an embodiment of the present application.

FIG. 3 is a flowchart of another file resource processing method disclosed according to an embodiment of the present application, which is further optimized and extended based on the above-mentioned technical solution, and may be combined with various optional implementations described above. Specifically, in the embodiment of the present application, a coordination server may be added to assist in relieving the data processing pressure of the resource server by communicating with an electronic device for executing the technical solution of the embodiment of the present application, recording terminal information and file resource information requested by the terminal, or so-called recording file resource allocation information. Taking a resource server as an example, for a distributed file system, the use of the coordination server can provide convenience for managing file resource allocation information of a plurality of resource server nodes, and improve the management efficiency and the management convenience of the file resource information entering a grace period on each server node. Moreover, for the case of a distributed file system, since the range of the limited service is reduced to specific resource granularity in the embodiment of the present application, there is no need to limit other server nodes to enter the grace period at the same time because one server node needs to enter the grace period after a failure occurs to the server node, i.e., the grace period state of one server node will not affect the availability state of other server nodes, compared with the prior art, the time and the range in which the distributed file system cannot provide the file resource service are shortened.

The coordination server may be a server or a distributed system. The following is an exemplary illustration of a coordination server that may be used to finely manage file resource information on a resource server, but is not to be construed as a specific limitation on embodiments of the present application.

1) The coordination server may record information about file resource on the resource server, as shown in Table 1, and may include, but be not limited to: file resource information, information of a terminal requesting a file resource, an access range of the resource requested by the terminal, an access operation type, whether being in a grace period or not and other state information (state). After the resource is marked as the state of entering the grace period, the information recorded on the coordination server may also include a protection range and a protection type of the resource within the grace period and the like.

The file resource information may include a file resource ID that can be used to uniquely identify a specific file resource in the file system, and the ID value remains unchanged during the existence of the file resource. The terminal information may include a terminal ID, which can be used to uniquely represent a terminal in the file system, and the ID value remains unchanged during the existence of the terminal. The access operation type of the resource or the protection type of the resource within the grace period may include a file lock type, and operations such as opening, closing, reading and rewriting of the file. Taking the file lock type as an example, the protection range of the file resource in the grace period may be the whole file or a part of the file, and the protection type may include sharing or mutex. There may be a plurality of resource state allocation records for the same file resource ID, which do not conflict with each other, thereby ensuring that file resource is not utilized incorrectly. In a case where the file resource currently applied by the terminal does not conflict with any existing resource record information, the terminal can apply for this file resource, and the coordination server updates the record information of the file resource according to the current request condition of the terminal for the file resource through information interaction with the resource server.

2) The coordination server may also record service record information that the resource server provides a file resource service to the terminal. As shown in Table 2, the service record information may include, but be not limited to: resource server information, terminal information for establishing communication connection with the resource server, last active time of the resource server and the like. The resource server information may include resource server ID, and each resource server has a unique ID in a file system; and the terminal information may include information such as a terminal ID.

TABLE 1

Information about file resources on the resource server recorded by the coordination server

| File resource ID | Terminal ID | State information (protection range, protection type of resource in a grace period, whether being in the grace period or not, and the like) |
|---|---|---|
| File resource 1 | Terminal 1 | State 1 |
|  |  | State 2 |
|  | Terminal 2 | State 3 |
| File resource 2 | Terminal 1 | State 4 |

TABLE 2

Service record information of the resource server recorded by the coordination server

| Resource server ID | Last active time | Terminal ID |
|---|---|---|
| Server 1 | 20200411145349 | Terminal 1 |
|  |  | Terminal 2 |
| Server 2 | 20200411145345 | Terminal 3 |

In addition, as an optimization, the coordination server may not need to record the state of file resource without sharing or mutex requirements, for example, the protection type of the file resource in the grace period only relates to the operation of opening, closing, reading, rewriting and the like of a file, and these resource states may preferably be recorded and processed locally at each resource server, to avoid that the coordination server itself becomes a performance bottleneck or a single point of failure of the file system. Moreover, these operations that do not involve file locks are recorded locally at the resource server, and also help to improve the response time of the resource server to a terminal request. Further, in the file system, the coordination server may only be used to record the file lock type of the file resource. The addition of the file lock may effectively avoid the phenomenon of read-write conflict occurring in the access process of the file resource requested by different access requests, and may ensure that the file resource is normally and orderly accessed. The resource state management is carried out by using the coordination server as an intermediate party of state information record, so that the data processing pressure of the resource server can be relieved, the normal access of file resources can be effectively ensured, and particularly for a distributed file system, the reasonable sharing of the resource state information among different resource servers can be ensured.

As shown in FIG. 3, a file resource processing method disclosed by an embodiment of the present application may include:

S301, sending a heartbeat request to the coordination server; wherein, the heartbeat request is used for instructing the coordination server to determine whether a request state of the terminal for a file resource on a resource server is invalid, and in a case where the request state of the terminal for the file resource on the resource server is invalid, the file resource having been requested by the terminal is marked as the state of entering the grace period.

In the embodiment of the present application, a lease mechanism may be established between a resource server and a coordination server, to assist in determining whether a request state for a file resource by a terminal establishing communication with the resource server is invalid, or to say whether a resource state held by the terminal is valid. The realization of lease mechanism needs to establish a lease duration and send a heartbeat request, and the lease duration can be set flexibly. Specifically, the resource server needs to periodically or regularly send a heartbeat request to the coordination server, and the coordination server may determine whether the heartbeat request is received within the valid lease period, according to the receiving time of the heartbeat request and the preset lease duration. Moreover, the heartbeat request may include terminal information for establishing communication connection with the resource server, such as the terminal identification, which can be used by the coordination server to determine the file resource requested by the terminal from the resource server, according to the corresponding relationship shown in table 1. The terminal information included in the heartbeat request may be information of an effective terminal without failure, so that the coordination server can determine the record information of the effective terminal corresponding to the resource server according to the information of the effective terminal.

In a case where the coordination server receives the heartbeat request within a valid lease period, the lease is valid, the request state of the terminal for the file resource on the resource server is valid, and the coordination server renews the lease for the resource server on the basis of the current lease period, i.e., the time when the request state of the terminal for the file resource on the resource server is valid can be prolonged, and the coordination server recalculates the time when the resource service lease expires. In a case where the coordination server does not receive the heartbeat request within a valid lease period, the lease is invalid, the request state of the terminal for the file resource on the resource server is invalid, and the coordination server may mark the file resource having been requested by the terminal as the state of entering the grace period, and then feed the marking information back to the resource server. The file resource marked as the state of entering the grace period requires the terminal to send an access request to the resource server again, to recover the holding state of the file resource.

By sending the heartbeat request, the coordination server can timely find out whether the request state of the terminal for the file resource on the resource server is invalid, and timely mark the file resource having been requested by the terminal to the resource server as the state of entering the grace period in the invalid state. Compared with the situation where the corresponding file resource is marked as the state of entering the grace period after the reestablishing resource state request is actively sent to the resource server through the terminal, the grace period may be entered earlier, the duration time of the grace period is shortened to a certain extent, and the service limit time of file resources is optimized.

S302, receiving a file resource access request of a terminal, and determining a target file resource requested to be accessed by the terminal according to the file resource access request.

S303, in response to determining that the file resource access request belongs to the reestablishing resource state request, sending the reestablishing resource state request to a coordination server, to instruct the coordination server to mark the target file resource as the state of entering the grace period.

That is, the resource server, after receiving a reestablishing resource state request sent by the terminal, forwards the reestablishing resource state request to the coordination server, so that the coordination server marks the target file resource as a state of entering a grace period according to information such as the terminal identification, the file name or the file identification requested to be accessed and the like included in the reestablishing resource state request. Moreover, after receiving the reestablishing resource state request, the coordination server can determine whether the service record information of the resource server requested by the current terminal changes relative to the previously recorded service record information of the resource server according to the terminal information and the resource server information included in this request, and in a case where the service record information of the resource server requested by the current terminal is changed, the current terminal is recorded in the new resource server.

The coordination server is also configured for releasing the state of entering the grace period for the target file resource, in a case where the grace period end condition is met. Optionally, the coordination server may start the timing of the grace period at the same time while marking the state, and end the timing of the grace period when notification information about the end of the execution of the access recovery operation for the file resource is received, thereby releasing the state of entering the grace period for the file resource. Further, for the case where reestablishing resource state requests of a plurality of file resources exist, the coordination server may take the receiving time of the received first reestablishing resource state request as the starting time of the grace period, and take the notification information of the end of the execution of the last received file access recovery operation as the ending time of the grace period, and at the moment, all file resources marked as the state of entering the grace period within the grace period are released. Or, in the case of starting from the grace period timing and in a case where a preset grace period time reaches a set time threshold value, the coordination server can end the grace period and release all file resources marked as the state of entering the grace period within the grace period regardless of whether notification information about the end of the execution of the access recovery operation is received. The coordination server will feed the released file resource information back to the resource server, to maintain the synchronization of the resource record information between the coordination server and the resource server. The specific way to end the grace period may be flexibly set according to an actual situation.

Of course, the resource server may also separately send notification information about the start of the grace period to the coordination server after receiving the reestablishing resource state request of the terminal, or may separately send notification information about the end of the grace period to the coordination server after the execution of the access recovery operation of the file resource ends, and the embodiments of the present application are not specifically limited thereto.

S304, executing an access operation corresponding to the file resource access request based on the target file resource, in response to determining that the file resource access request does not belong to the reestablishing resource state request.

According to the technical solution of the embodiment of the present application, the reestablishing resource state request and the non-reestablishing resource state request are distinguished and processed within the failure recovery grace period after the failure occurring to the server or the terminal, so as to realize to provide a brand-new failure recovery mechanism of a network file system, reduce the range of limited services within a failure recovery grace period from a system level (or a terminal level) to a resource level, i.e., limiting the specific file resource that the server can provide to the terminal within the failure recovery grace period, rather than leaving the server as a whole in a state where it cannot provide services other than resource recovery to the terminal or leaving the terminal in a state where it cannot request services other than resource recovery, thereby solving the problem that the server is in an unavailable state for a long time due to that the server only executes the operation related to reestablishment resource state within the failure recovery grace period in the existing solution, and improving the usability of the file system. Moreover, before a reestablishing resource state request of the terminal is received, the effect of entering the grace period in advance and optimizing the service limit time of the file resource are achieved by sending the heartbeat information.

On the basis of the above-mentioned technical solution, further, in a process of marking a target file resource as a state of entering a grace period, the method may further include: recording a resource protection range and a protection type of the target file resource within the grace period; wherein, the protection type at least includes a file lock type.

Specifically, for the case where a coordination server exists, the resource protection range and protection type of the target file resource within the grace period may also be recorded by the coordination server. Illustratively, the coordination server may query the record information of the target file resource held by the terminal in the resource allocation information recorded before a failure occurs, according to the terminal information carried in the file resource access request, thereby determining and recording the resource protection range and protection type of the target file resource within the grace period.

Optionally, before receiving the reestablishing resource state request of the terminal, the method disclosed in the embodiments of the present application may further include:

sending a preset request to the coordination server in a case where a resource server is restarted; wherein, the preset request is used for instructing the coordination server to mark a file resource requested by the terminal from the resource server as the state of entering the grace period. The preset request refers to a specific request sent to a coordination server after a resource server restarts, and can be a specific heartbeat request or a request in other formats. The embodiments of the present application do not define the specific implementation form of the preset request, and a person skilled in the art may flexibly set the implementation form of the preset request according to the marking situation that file resources enter a grace period in a scenario where a restart can be distinguished. The preset request may include terminal information for establishing communication connection with the resource server, such as terminal identification and the like. The terminal information may be used by the coordination server to determine the file resource requested by the terminal from the resource server.

After the server is restarted, communication interruption may occur to a file resource requested by the terminal, at the moment, the resource server actively sends a preset request to the coordination server, notifies the coordination server of the restart of the server itself, and instructs the coordination server to mark the file resources having been requested by the terminal to the resource server as a state of entering a grace period, without waiting for the terminal to send a reestablishing resource state request for the file resource, so that the delay of the grace period duration due to communication interaction can be reduced and the release time of the file resource can be optimized. Particularly for the case of a distributed file system, since the range of the limited service is reduced to resource granularity in the embodiment of the present application, there is no need to limit other server nodes to enter the grace period at the same time because one server node needs to enter the grace period after the restart occurs to the server node, compared with the prior art, the time and the range in which the distributed file system cannot provide the file resource service are shortened.

In addition, for a case where a lease exists between the coordination server and the resource service, the coordination server can stop the existing lease time of the resource server immediately after receiving a preset request sent by the resource, and restart a new lease timing, so that the lease aging is rationalized, and thus the rationality of judging whether the request state of the file resource on the resource server is invalid by the terminal is ensured.

Optionally, before receiving the reestablishing resource state request of the terminal, the method disclosed in the embodiments of the present application may further include:

sending notification information to the coordination server in a case where the terminal is monitored to fail; wherein, the notification information is used for instructing the coordination server to mark the file resource having been requested by the terminal from a resource server as the state of entering the grace period. The notification information may include terminal information for establishing communication connection with the resource server and having failed, such as terminal identification. The terminal information may be used by the coordination server to determine the file resource requested by the terminal from the resource server.

After monitoring that a failure occurs to the terminal, the resource server actively sends notification information to the coordination server, and marks the file resource as a state of entering a grace period, without waiting for the terminal to send a reestablishing resource state request for the file resource, so that the delay of the grace period duration due to communication interaction can be reduced and the release time of the file resource can be optimized. The coordination server may also remove the failed terminal information from the locally recorded file resource allocation information, in a process of marking the file resource as the state of entering the grace period. Of course, the resource server may also locally mark the file resource having been requested by the terminal as the state of entering the grace period, in response to the restart of the resource service or monitoring that a failure occurs to the terminal.

Further, the coordination server may be further configured for determining a starting time of the grace period in a process of marking the file resource requested by the terminal as the state of entering the grace period. For example, for the above-mentioned several cases, the coordination server may take the time that the heartbeat request, the preset request or the notification information sent by the resource server is received, as the starting time of the grace period, so as to realize the optimization of grace period duration and the optimization of resource release time.

Figure 4:
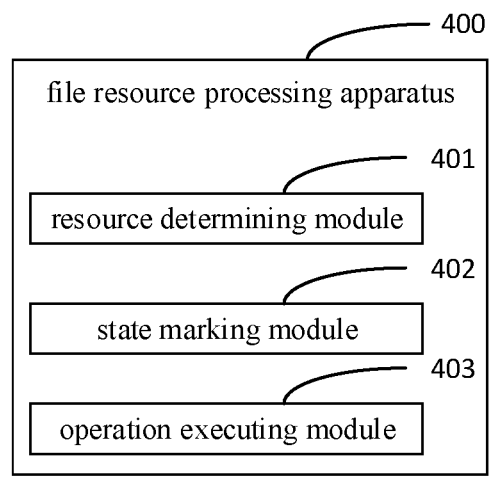
FIG. 4 is a structural diagram of a file resource processing apparatus according to the embodiment of the present application.

FIG. 4 is a structural diagram of a file resource processing apparatus disclosed according to an embodiment of the present application, and the embodiment of the present application may be applied to the case of how to process file resource in a server within a grace period of failure recovery after a failure occurs to a terminal or a server. The file resource processing apparatus may be implemented by software and/or hardware, and may be integrated on any electronic device with computing capabilities, such as a server supporting a network file system.

As shown in FIG. 4, the file resource processing apparatus 400 disclosed by the embodiment of the present application may include a resource determining module 401, a state marking module 402 and an operation executing module 403, wherein:

the resource determining module 401 is configured for receiving a file resource access request of a terminal, and determining a target file resource requested to be accessed by the terminal according to the file resource access request;

the state marking module 402 is configured for marking the target file resource as a state of entering a grace period, in response to determining that the file resource access request belongs to a reestablishing resource state request;

the operation executing module 403 is configured for executing an access operation corresponding to the file resource access request based on the target file resource, in response to determining that the file resource access request does not belong to the reestablishing resource state request.

Optionally, the apparatus disclosed in the embodiments of the present application may further include:

a state releasing module configured for releasing the state of entering the grace period for the target file resource, in a case where a grace period end condition is met, after the state marking module 402 executes an operation of marking the target file resource as the state of entering the grace period.

Optionally, grace period end condition may include: a preset grace period time reaches a set time threshold value or an execution of an access recovery operation for the target file resource ends.

Optionally, the state marking module 402 may include:

a reestablishment request determining unit configured for determining that the file resource access request belongs to the reestablishing resource state request, in a case where the target file resource is inquired from file resource allocation information recorded before a failure occurs; wherein, the file resource allocation information includes terminal information and file resource information requested by the terminal; and a state marking unit configured for marking the target file resource as the state of entering the grace period.

Optionally, the state marking module 402 may be specifically configured for:

in response to determining that the file resource access request belongs to the reestablishing resource state request, sending the reestablishing resource state request to a coordination server, to instruct the coordination server to mark the target file resource as the state of entering the grace period.

Optionally, the state marking module 402 configured further configured for:

recording a resource protection range and a protection type of the target file resource within the grace period; wherein, the protection type at least includes a file lock type.

Optionally, the apparatus disclosed in the embodiments of the present application may further include:

a heartbeat request sending module configured for sending a heartbeat request to the coordination server; wherein, the heartbeat request is used for instructing the coordination server to determine whether a request state of the terminal for a file resource on a resource server is invalid, and in a case where the request state of the terminal for the file resource on the resource server is invalid, the file resource having been requested by the terminal is marked as the state of entering the grace period.

Optionally, the apparatus disclosed in the embodiments of the present application may further include:

a preset request sending module configured for sending a preset request to the coordination server in a case where a resource server is restarted; wherein, the preset request is used for instructing the coordination server to mark the file resource requested by the terminal from the resource server as the state of entering the grace period.

Optionally, the apparatus disclosed in the embodiments of the present application may further include:

a notification information sending module configured for sending notification information to the coordination server in a case where the terminal is monitored to fail; wherein, the notification information is used for instructing the coordination server to mark the file resource having been requested by the terminal from a resource server as the state of entering the grace period.

Optionally, the coordination server may be further configured for determining a starting time of the grace period in a process of marking the file resource requested by the terminal as the state of entering the grace period.

Optionally, the apparatus disclosed in the embodiments of the present application may be configured in a distributed file system.

The file resource processing apparatus 400 disclosed in the embodiment of the present application may execute any file resource processing method disclosed in the embodiments of the present application, and has functional modules and beneficial effects corresponding to the execution method. Contents which are not described in detail in the apparatus embodiment of the present application may be referred to the descriptions in any method embodiment of the present application.

The embodiments of the present application also provides an electronic device and a readable storage medium according to the embodiments of the present application.

Figure 5:
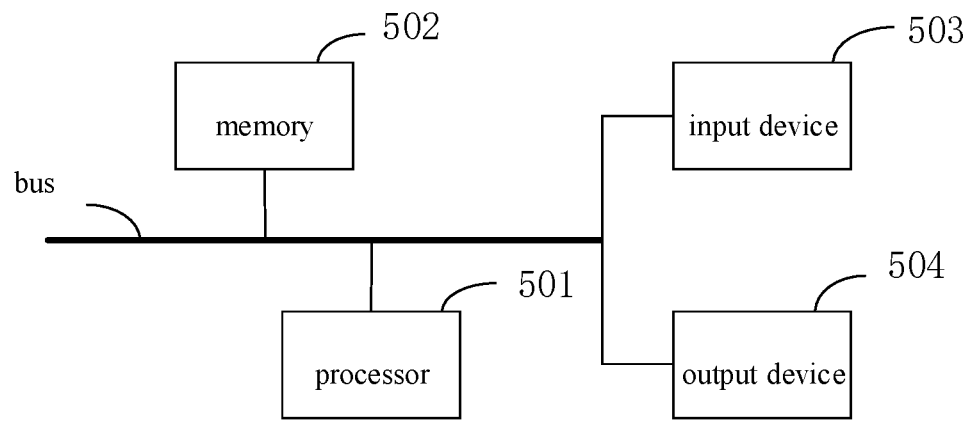
FIG. 5 is a block diagram of an electronic device according to an embodiment of the present application.

FIG. 5 is a block diagram of an electronic device for implementing a file resource processing method in the embodiment of the present application. The electronic device is intended to represent various forms of digital computers, such as laptop computers, desktop computers, workstations, personal digital assistants, servers, blade servers, mainframe computers, and other suitable computers. The electronic device may also represent various forms of mobile devices, such as a personal digital assistant, a cellular telephone, a smart phone, a wearable device, and other similar computing devices. The components shown herein, their connections and relationships, and their functions are by way of example only and are not intended to limit the implementations of the embodiments of the present application described and/or claimed herein.

As shown in FIG. 5, the electronic device may include one or more processors 501, a memory 502, and interfaces for connecting components, including high-speed interfaces and low-speed interfaces. The respective components are interconnected by different buses and may be mounted on a common main-board or otherwise as desired. The processor may process instructions executed within the electronic device, including instructions stored in or on the memory to display graphical information of a graphical user interface (GUI) on an external input/output device, such as a display device coupled to the interface. In other implementations, a plurality of processors and/or buses may be used with a plurality of memories, if necessary. Also, a plurality of electronic devices may be connected, each providing some of the necessary operations (e.g., as an array of servers, a set of blade servers, or a multiprocessor system). An example of a processor 501 is shown in FIG. 5.

The memory 502 is a non-transitory computer readable storage medium provided by the embodiments of the present application. The memory stores instructions executable by at least one processor to cause the at least one processor to execute the file resource processing method provided by the embodiment of the present application. The non-transitory computer readable storage medium of the embodiments of the present application stores computer instructions used for enabling a computer to execute the file resource processing method provided by the embodiments of the present application.

The memory 502, as a non-transitory computer-readable storage medium, may be configured to store non-transitory software programs, non-transitory computer executable programs and modules, such as program instructions/modules corresponding to the file resource processing method in the embodiments of the present application, e.g., the resource determining module 401, the state marking module 402 and the operation executing module 403 shown in FIG. 4. The processor 501 executes various functional applications and data processing of the server by running the non-transitory software programs, instructions and modules stored in the memory 902, that is, implements the file resource processing method in the above-mentioned method embodiments.

The memory 502 may include a program storage area and a data storage area, wherein the program storage area may store an operating system, and an application program required for at least one function; and the data storage area may store data created according to the use of the electronic device. In addition, the memory 502 may include a high speed random access memory, and may also include a non-transitory memory, such as at least one disk storage device, a flash memory device, or other non-transitory solid state storage devices. In some embodiments, the memory 502 may optionally include memories remotely located with respect to the processor 501, and these remote memories may be connected, via a network, to the electronic device for implementing the file resource processing method in this embodiment. Examples of such networks may include, but are not limited to, the Internet, an intranet, a local area network, a mobile communication network and combinations thereof.

The electronic device for implementing the file resource processing method in the embodiment of the present application may further include an input device 503 and an output device 504. The processor 501, the memory 502, the input device 503, and the output device 504 may be connected by a bus or in other ways, and the bus connection is taken as an example in FIG. 5.

The input device 503 may receive input digitals or character information, and generate a key signal input related to a user setting and a function control of an electronic device for implementing the file resource processing method in this embodiment. For example, the input device may be a touch screen, a keypad, a mouse, a track pad, a touch pad, a pointer stick, one or more mouse buttons, a track ball, a joystick, and other input devices. The output device 504 may include a display apparatus, an auxiliary lighting device (e.g., a light emitting diode (LED)), a tactile feedback device (e.g., a vibrating motor), etc. The display apparatus may include, but is not limited to, a liquid crystal display (LCD), an LED display, and a plasma display. In some embodiments, the display apparatus may be a touch screen.

Various implementations of the systems and techniques described herein may be implemented in a digital electronic circuit system, an integrated circuit system, an application specific integrated circuit (ASIC), a computer hardware, a firmware, a software, and/or a combination thereof. These various implementations may include an implementation in one or more computer programs, which can be executed and/or interpreted on a programmable system including at least one programmable processor; the programmable processor may be a dedicated or general-purpose programmable processor and capable of receiving and transmitting data and instructions from and to a storage system, at least one input device, and at least one output device.

These computing programs (also referred to as programs, software, software applications, or codes) may include machine instructions of a programmable processor, and may be implemented using high-level procedural and/or object-oriented programming languages, and/or assembly/machine languages. As used herein, the terms "machine-readable medium" and "computer-readable medium" may refer to any computer program product, apparatus, and/or device (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" may refer to any signal used to provide machine instructions and/or data to a programmable processor.

In order to provide an interaction with a user, the system and technology described here may be implemented on a computer having: a display device (e. g., a cathode ray tube (CRT) or a liquid crystal display (LCD) monitor) for displaying information to the user; and a keyboard and a pointing device (e. g., a mouse or a trackball), through which the user can provide an input to the computer. Other kinds of devices can also provide an interaction with the user. For example, a feedback provided to the user may be any form of sensory feedback (e.g., visual feedback, auditory feedback, or tactile feedback); and an input from the user may be received in any form, including an acoustic input, a voice input or a tactile input.

The systems and techniques described herein may be implemented in a computing system (e.g., as a data server) that may include a background component, or a computing system (e.g., an application server) that may include a middleware component, or a computing system (e.g., a user computer having a graphical user interface or a web browser through which a user may interact with embodiments of the systems and techniques described herein) that may include a front-end component, or a computing system that may include any combination of such background components, middleware components, or front-end components. The components of the system may be connected to each other through a digital data communication in any form or medium (e.g., a communication network). Examples of the communication network may include a local area network (LAN), a wide area network (WAN) and the Internet.

The computer system may include a client and a server. The client and the server are typically remote from each other and typically interact via the communication network. The relationship of the client and the server is generated by computer programs running on respective computers and having a client-server relationship with each other.

According to the technical solution of the embodiment of the present application, the target file resource corresponding to the reestablishing resource state request sent by the terminal is marked as the state of entering the grace period within the failure recovery grace period, target file resources corresponding to other requests not belonging to the reestablishing resource state request sent by the terminal are still used as resource objects for normally providing the file service, so as to realize to provide a brand-new failure recovery mechanism of a network file system, reduce the range of limited services within a failure recovery grace period from a system level (or a terminal level) to a resource level, and improve the usability of the file system.

It should be understood that the steps can be reordered, added or deleted using the various flows illustrated above. For example, the steps described in the present application may be performed concurrently, sequentially or in a different order, so long as the desired results of the technical solutions disclosed in the present application can be achieved, and there is no limitation herein.

The above-described specific embodiments do not limit the scope of the present application. It will be apparent to those skilled in the art that various modifications, combinations, sub-combinations and substitutions are possible, depending on design requirements and other factors. Any modifications, equivalent substitutions, and improvements within the spirit and principles of this application are intended to be included within the scope of this application.

What is claimed is:

1. A file resource processing method, comprising:
receiving a file resource access request of a terminal, and determining a target file resource requested to be accessed by the terminal according to the file resource access request;
marking the target file resource as a state of entering a grace period, in response to determining that the file resource access request belongs to a reestablishing resource state request; and
executing an access operation corresponding to the file resource access request based on the target file resource, in response to determining that the file resource access request does not belong to the reestablishing resource state request,
wherein, before receiving the reestablishing resource state request of the terminal, the method further comprises at least one of:
sending a heartbeat request to a coordination server; wherein, the heartbeat request is used for instructing the coordination server to determine whether a request state of the terminal for a file resource on a resource server is invalid, and in a case where the request state of the terminal for the file resource on the resource server is invalid, the file resource having been requested by the terminal is marked as the state of entering the grace period;
sending a preset request to the coordination server in a case where a resource server is restarted; wherein, the preset request is used for instructing the coordination server to mark the file resource requested by the terminal from the resource server as the state of entering the grace period; and
sending notification information to the coordination server in a case where the terminal is monitored to fail; wherein, the notification information is used for instructing the coordination server to mark the file resource having been requested by the terminal from a resource server as the state of entering the grace period.

2. The method according to claim 1, wherein, after marking the target file resource as the state of entering the grace period, the method further comprises:

releasing the state of entering the grace period for the target file resource, in a case where a grace period end condition is met.

3. The method according to claim 2, wherein, the grace period end condition comprises: a preset grace period time reaches a set time threshold value or an execution of an access recovery operation for the target file resource ends.

4. The method according to claim 1, wherein, the determining that the file resource access request belongs to the reestablishing resource state request, comprising:
determining that the file resource access request belongs to the reestablishing resource state request, in a case where the target file resource is inquired from file resource allocation information recorded before a failure occurs; wherein, the file resource allocation information comprises terminal information and file resource information requested by the terminal.

5. The method according to claim 1, wherein, the marking the target file resource as the state of entering the grace period, in response to determining that the file resource access request belongs to the reestablishing resource state request, comprising:
in response to determining that the file resource access request belongs to the reestablishing resource state request, sending the reestablishing resource state request to the coordination server, to instruct the coordination server to mark the target file resource as the state of entering the grace period.

6. The method according to claim 1, wherein, in a process of marking the target file resource as the state of entering the grace period, the method further comprising:
recording a resource protection range and a protection type of the target file resource within the grace period; wherein, the protection type at least comprises a file lock type.

7. The file resource processing method according to claim 1, wherein, the coordination server is further configured for determining a starting time of the grace period in a process of marking the file resource requested by the terminal as the state of entering the grace period.

8. The method according to claim 5, wherein, the method is applied to a distributed file system.

9. A file resource processing apparatus, comprising:
a processor and a memory for storing one or more computer programs executable by the processor,
wherein when executing at least one of the computer programs, the processor is configured to perform operations comprising:
receiving a file resource access request of a terminal, and determining a target file resource requested to be accessed by the terminal according to the file resource access request;
marking the target file resource as a state of entering a grace period, in response to determining that the file resource access request belongs to a reestablishing resource state request; and
executing an access operation corresponding to the file resource access request based on the target file resource, in response to determining that the file resource access request does not belong to the reestablishing resource state request,
wherein, when executing at least one of the computer programs, the processor is configured to further perform operations comprising at least one of:
sending a heartbeat request to a coordination server; wherein, the heartbeat request is used for instructing the coordination server to determine whether a request state of the terminal for a file resource on a resource server is invalid, and in a case where the request state of the terminal for the file resource on the resource server is invalid, the file resource having been requested by the terminal is marked as the state of entering the grace period;
sending a preset request to the coordination server in a case where a resource server is restarted; wherein, the preset request is used for instructing the coordination server to mark the file resource requested by the terminal from the resource server as the state of entering the grace period; and
sending notification information to the coordination server in a case where the terminal is monitored to fail; wherein, the notification information is used for instructing the coordination server to mark the file resource having been requested by the terminal from a resource server as the state of entering the grace period.

10. The apparatus according to claim 9, wherein, when executing at least one of the computer programs, the processor is configured to further perform operations comprising:
releasing the state of entering the grace period for the target file resource, in a case where a grace period end condition is met, after the state marking module executes an operation of marking the target file resource as the state of entering the grace period.

11. The apparatus according to claim 10, wherein, the grace period end condition comprises: a preset grace period time reaches a set time threshold value or an execution of an access recovery operation for the target file resource ends.

12. The apparatus according to claim 9, wherein, when executing at least one of the computer programs, the processor is configured to further perform operations comprising:
determining that the file resource access request belongs to the reestablishing resource state request, in a case where the target file resource is inquired from file resource allocation information recorded before a failure occurs; wherein, the file resource allocation information comprises terminal information and file resource information requested by the terminal; and
marking the target file resource as the state of entering the grace period.

13. The apparatus according to claim 9, wherein, when executing at least one of the computer programs, the processor is configured to further perform operations comprising:
in response to determining that the file resource access request belongs to the reestablishing resource state request, sending the reestablishing resource state request to the coordination server, to instruct the coordination server to mark the target file resource as the state of entering the grace period.

14. The apparatus according to claim 9, wherein, when executing at least one of the computer programs, the processor is configured to further perform operations comprising:
recording a resource protection range and a protection type of the target file resource within the grace period; wherein, the protection type at least comprises a file lock type.

15. The apparatus according to claim 9, wherein, when executing at least one of the computer programs, the processor is configured to further perform operations comprising: determining a starting time of the grace period in a process of marking the file resource requested by the terminal as the state of entering the grace period.

16. The apparatus according to claim 13, wherein, the apparatus is configured in a distributed file system.

17. A non-transitory computer readable storage medium storing computer instructions, wherein the computer instructions cause a computer to perform operations comprising:
   receiving a file resource access request of a terminal, and determining a target file resource requested to be accessed by the terminal according to the file resource access request;
   marking the target file resource as a state of entering a grace period, in response to determining that the file resource access request belongs to a reestablishing resource state request and
   executing an access operation corresponding to the file resource access request based on the target file resource, in response to determining that the file resource access request does not belong to the reestablishing resource state request,
   wherein the computer instructions cause the computer to further perform operations comprising at least one of:
   sending a heartbeat request to a coordination server; wherein, the heartbeat request is used for instructing the coordination server to determine whether a request state of the terminal for a file resource on a resource server is invalid, and in a case where the request state of the terminal for the file resource on the resource server is invalid, the file resource having been requested by the terminal is marked as the state of entering the grace period;
   sending a preset request to the coordination server in a case where a resource server is restarted; wherein, the preset request is used for instructing the coordination server to mark the file resource requested by the terminal from the resource server as the state of entering the grace period; and
   sending notification information to the coordination server in a case where the terminal is monitored to fail; wherein, the notification information is used for instructing the coordination server to mark the file resource having been requested by the terminal from a resource server as the state of entering the grace period.

18. The non-transitory computer readable storage medium according to claim 17, wherein the computer instructions cause the computer to further perform operations comprising:
   after marking the target file resource as the state of entering the grace period, releasing the state of entering the grace period for the target file resource, in a case where a grace period end condition is met.

* * * * *